J. G. McCAULEY.
Harrow.
No. 11,614.
Patented Aug. 29. 1854.
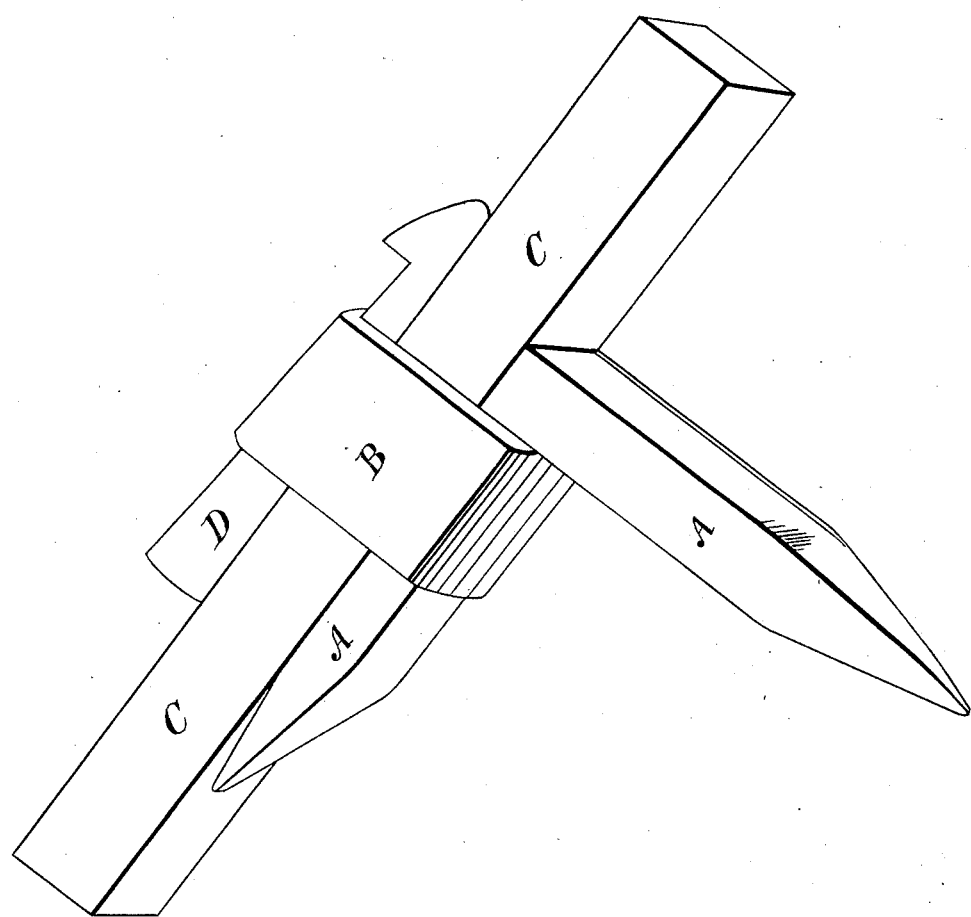

UNITED STATES PATENT OFFICE.

JOHN G. McCAULEY, OF STONE BRIDGE, VIRGINIA.

IMPROVEMENT IN HARROWS.

Specification forming part of Letters Patent No. 11,614, dated August 29, 1854.

*To all whom it may concern:*

Be it known that I, JOHN G. MCCAULEY, of Stone Bridge, in the county of Clark and State of Virginia, have invented a new and useful Improvement in Harrows; and I do hereby declare that the following is a full and exact description thereof, reference being had to the accompanying drawings, and to the letters of reference marked thereon.

The nature of my invention consists in having the teeth double and attached to the beam by means of a band and key.

To enable others skilled in the art to make and use my invention, I will proceed to describe its construction and operation.

My improvement is applicable to harrows of any of the known forms. The double tooth is formed by bending a bar of sufficient size in the center to a right or somewhat less angle, if desired. Each tooth is about eight inches long from the bend and tapered toward the ends to a point. One branch of the tooth fits against the bottom of the beam and the other extends or falls perpendicular and into the ground. When worn the tooth may be changed and a sharp unworn tooth presented. The double tooth thus described is shown at A A. The band, as shown at B, is made of a strap of iron about two and a half inches wide and a quarter of an inch thick, of such length and dimensions as to embrace closely the tooth, the beam, and the key. C is the beam, (or an illustrative portion of a beam,) which is about one inch and a quarter in diameter, and is square or flat, as may be desired. D is the key, which should correspond in thickness and taper with the band and beam and be about five inches long.

Having thus described my invention and its operation, what I claim as my invention, and desire to secure by Letters Patent, is—

The constructing the double tooth so that one portion may operate on the ground and the other be in reserve, and also serve as a shank to confine the tooth to the beam in connection with the band and key, substantially as set forth.

J. G. McCAULEY.

Witnesses:
JOHN DOW,
HIRAM P. EVANS.